United States Patent [19]

Schwartz et al.

[11] Patent Number: 4,511,229
[45] Date of Patent: Apr. 16, 1985

[54] METHOD AND APPARATUS FOR EVALUATION OF COLOR INFORMATION IN PHOTOGRAPHIC PROCESSES

[76] Inventors: Jack Schwartz; Tai T. Wu, both of 147 Ridge St., Arlington, Mass. 02174

[21] Appl. No.: 502,561

[22] Filed: Jun. 9, 1983

[51] Int. Cl.³ .............................................. G03B 41/00
[52] U.S. Cl. ...................................... 354/20; 354/430; 354/105
[58] Field of Search .................. 354/430, 478, 482, 20, 354/105, 106, 109; 355/38

[56] References Cited

U.S. PATENT DOCUMENTS

| | | | |
|---|---|---|---|
| 3,452,658 | 7/1969 | Krull et al. | 354/430 |
| 3,500,730 | 3/1970 | Matsubara et al. | 354/430 |
| 3,580,149 | 5/1971 | Fujisawa | 354/430 |
| 3,672,268 | 6/1972 | Scheibel et al. | 354/430 |
| 3,864,699 | 2/1975 | Tsunekawa et al. | 354/478 |
| 4,041,308 | 8/1977 | Fujita | 354/430 |
| 4,079,388 | 3/1978 | Takahama et al. | 354/430 |
| 4,211,558 | 7/1980 | Oguchi et al. | 354/109 |
| 4,335,943 | 6/1982 | Nomata | 354/482 |
| 4,353,641 | 10/1982 | Merlo | 355/38 |

*Primary Examiner*—Russell E. Adams
*Attorney, Agent, or Firm*—Robert F. Van Epps

[57] ABSTRACT

Method and apparatus for developing and recording information relating to the color present in a scene under certain illumination conditions. The developed information may be analyzed and compared against certain standards and adjustments made either before or after the scene is recorded on color film to maximize fidelity of the color reproduction during the processing of negatives and prints from said film. An optimized exposure correction is provided for any given set of specific primary spectra of each film layer sensitivity and print dye component for a preferred set of test colors.

16 Claims, 5 Drawing Figures

METHOD AND APPARATUS FOR EVALUATION OF COLOR INFORMATION IN PHOTOGRAPHIC PROCESSES

BACKGROUND OF THE INVENTION

1. Cross Reference to Related Applications

This application is related to our pending patent application Ser. No. 06/479,275 filed on Mar. 28, 1983, and entitled Method and Apparatus for Correcting Distortions in Reproducing Systems.

2. Field of the Invention

The present invention relates generally to an improved method and apparatus for improving the color rendition in color photos, and more particularly to apparatus and techniques for generating data useful in controlling the fidelity in color prints.

3. Description of the Prior Art

The prior art most relevant to the present invention has arisen in the area of methods and devices for evaluating color photographic negatives and determining color compensation and filter combinations to optimize the reproduction fidelity of the print. Representative of this prior art is U.S. Pat. No. 3,761,183 which issued to Yuasa, et.al. on Sept. 25, 1973, and entitled Device for Measuring Color-Compensation Quantity for Color Printing. The patent is directed to a system for determining the optimal color compensating filters to be used in a photo enlarger when printing a given negative. The system uses photo detectors sensitive in the red, green and blue spectrum ranges to sense the average spectral content of a given negative. Signals from the respective photo detectors are compared to determine the color compensating quantities in the green, blue and red signals and are thus used to determine the exposure time.

U.S. Pat. No. 4,217,648 entitled Method and Apparatus for Evaluating Color Photographic Negatives Prior to Copying which issued to Thrum, et.al. on Aug. 12, 1980, is directed to a system which provides a measure of compensation for negatives exhibiting areas of dominant color. The color density in each of the primary colors in each of a plurality of unit areas of a negative is measured and compared in a computer with the respective densities in adjacent areas. The difference between the results of the measurements of two adjacent unit areas is stored only when it is below a predetermined value. The stored results indicate the presence or absence of areas of dominant color and are used to adjust the copying light accordingly.

Early developments in this same field included that in U.S. Pat. No. 3,199,402 which issued to Hunt, et.al. on Aug. 10, 1965, which disclosed a method of measuring the amount by which the color of the printing light has been altered with the necessary calibrations for such. The disclosed arrangement involved the use of photo electric cells filtered so as to reproduce the spectral sensitivity curves of the color print material being used. Output from differently filtered cells are subtracted from one another in pairs so that only differences and not absolute magnitudes are measured. Thus, color balance was evaluated independently of overall intensity providing greater control in the system.

SUMMARY OF THE INVENTION

The present invention utilizes apparatus which gathers samples of the light illuminating a particular scene, this light is then passed by means of several different suggested techniques through a set of filters of different colors after which the resultant information is recorded from individual filters or combinations of filters as different bits of color information. This color information is then compared to certain standardized information so that a correcting signal or program can be generated. This correcting program is then utilized to provide manual or automatic selection of compensating filters so that the desired photo may be taken with proper color filtration in order that prints made from said negatives require no further compensating techniques. Alternately, the compensation can take place during the printing process by comparing the recorded color information against a standard utilized in the printing process and using the output to control operational filters, video scanning equipment or operation of other types of printing equipment as appropriate. By recording color spots in known locations on the negative the printing process may be automatically or manually adjusted to maximize color fidelity without resort to human judgment normally required in the recognition of scene objects by their colors.

Accordingly, it is the object of the present invention to provide a new and useful technique for compensating for proper color rendition in a manner which may be described as analogous to focusing, concentrating however on color rendition rather than on sharpness and in turn overcoming the drawbacks present in prior art systems.

DESCRIPTION OF THE PREFERRED EMBODIMENTS

As noted previously, the technique set forth in the present invention may be considered as analogous to focusing but for the purpose of color rendition fidelity rather than for image sharpness. The complete utilization of the process of the present invention requires a source light, a scene to be photographed, film exposure, film development and subsequently film printing. In the present system, it is preferred to use a set of transmission filters of different colors covering a broad range of likely scene colors. However, as an alternate choice, with reduced sensitivity, a set of reflection colors covering a broad range of likely scene colors such as found in the "Macbeth" Color Checker test chart might also be employed.

The filters or reflected color set require exposure to light with the same spectrum as the principal illumination for the scene to be photographed. Such exposure may be obtained by illuminating the test set with light collected by a separate optical system from the camera and directed so as to collect light from the illuminating source rather than from the scene itself. Alternately, the exposure could be obtained with an auxiliary lens directed at a white object, an object of known color, or a reflection of the illuminating source somewhere in the scene. Either of these arrangements can be employed in a non-simultaneous arrangement with the photographic exposure. An auxiliary optical system to collect the required light may be eliminated by use of the main camera lens and related optics for this purpose. The collected light must be directed through test filters onto an assigned location on the film margin to be recorded as color information. This alternate optical channel can be shared with the viewfinder and focusing functions for example in a single lens reflex camera.

Figure 1:
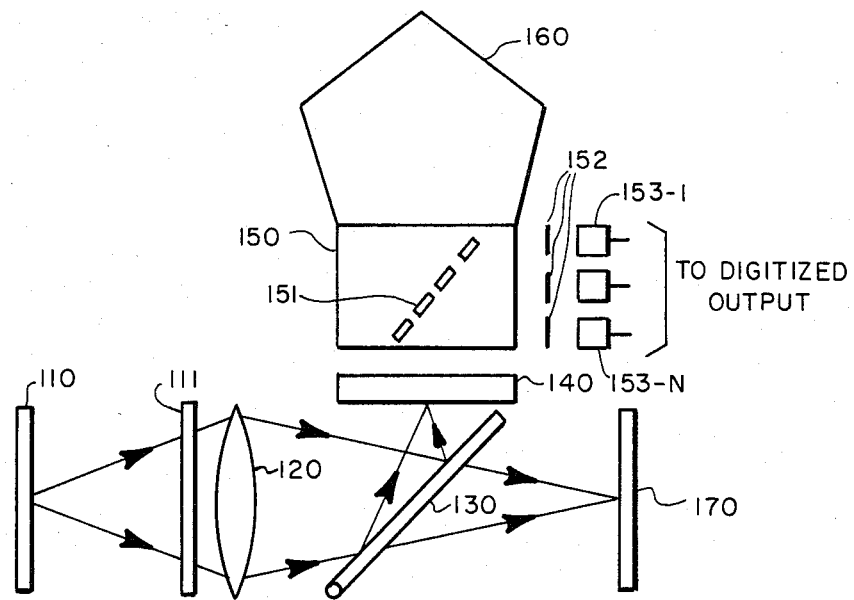
FIG. 1 is a diagram of photographic apparatus in accordance with the present invention wherein a digital output indicative of the color information determines the appropriateness of a color filter used with the system's principal optical path.

The apparatus and method of the present invention can be used in several different ways which shall be set forth in the following:

The first implementation of the apparatus and techniques of the present invention is for use as a color exposure meter useful for making pre photographic adjustments. This device can be either a separate instrument or an auxiliary to a camera as shown in FIG. 1. In the latter arrangement, the color meter may be pointed at the prime source of picture illumination (in which case the collector may include nonimaging optics such as the use of fiber optics or a light guide channel). Alternatively, if the field is suitably lighted it may be directed to collect the light from a known white area as shown in FIG. 1. The color from this area will then match the illuminating color for the scene. In either case, a sample is taken of the source light.

Once collected, the sample light is made as homogeneous as possible and directed to an array of test filters 152 whose spectra comprise the chosen test colors. As noted in FIG. 1, it is drawn from the white area in the scene 110 through the main lens 120 and reflected off the picture taking mirror 130, then through field lens 140. The sample is divided by the beam splitter 151 between the exposure meter apparatus 153 and the conventional pentaprism view finder 160 as typically found in single lens reflex cameras. A portion of the light is deflected by means of the beam splitting surfaces 151 and directed through the filter array 152 which consists of an array of filters of the test colors as indicated above. These filters 153-1 to 153-N will include the appropriate set of test color filters the output of which may be detected, digitized and stored. It is to this information that the correction algorithm set forth in our copending application may be applied to determine the value of the appropriate corrective filter 111 to be placed on the camera main lens 120 to provide the proper compensation for the color illuminating the scene to be photographed.

Detectors 153-1 to 153-N are in groups of three with each of the three corresponding in its spectral sensitivity vs. wavelength respectively to one of the film primaries red, green or blue. The resulting signals arranged in an array, according to the foregoing discussion comprise the elements on which the proper filter determination is made. Similarly, the corresponding elements taken under reference conditions or reference illumination applied to a standard white object at proper exposure, will yield similar elements.

By application of the correcting algorithm set forth in our copending application, a magnitude of correction index will indicate for which filter 111 the given test color set (as represented by the specific choice of transmissive or reflective colors in the set 152) requires the least correction for optimal rendition of this set. Thus, the filters 111 can be changed until a minimum value of this index is achieved. An ideal corrective filter would give a null for this index. If a null cannot be thus reached, the correction algorithm applied to the two sets of test spot colors (the original and as developed on the film) will yield a print or copy corrected to provide the optimal net reproduction for the given primary spectra and for the given set of test colors.

Referring again to FIG. 1, a calibration shutter (not shown) may be operated by the photographer with the duration of open time determined by integration of the output of a photo cell. The light passing through the main lens 120 and subsequently through the calibration shutter passes through the series of transparency type filters 152 previously described and from there to the detectors 153-1 to 153-N. In this arrangement the color data recording lens is focused so its object plane is the effective aperture of the main lens and, its image plane is where the filters are located. Thus each filter may occupy a small space. This technique effectively scrambles all image light falling within the exposure equipment range and select area boundaries become visible by means of the mirror 130 in the viewfinder 160. Either before or after taking the selected picture, the photographer directs the selected exposure meter area of the viewfinder to enclose either a sample of the principal illumination source or an object illuminated by it in or out of the scene and actuates the calibration shutter. As previously noted, a photocell integrator then will cause the assigned color data recording areas on the film margin to be correctly exposed for optimal color correction in printing the slide or negative.

Either the set of color test spots in the film margin or the corresponding digitized electronic signals allow automation of color correction during printing or copying thus eliminating the need for human operator judgment when a color correction algorithm of the type described in the referenced co-pending application is used. The judgment factor is entered in the choice of the test color set; the correction algorithm, when provided with correct inputs including the above described test color spots based on a sample of scene illumination, will perform consistent corrections for a variety of scene material. The reason for the high quality of color correction to be expected, within the limits of the photographic materials available, is that with this set of test color spots, the correction algorithm accounts for Illumination color (or color temperature)
Scene exposure
Reciprocity failure (especially important in color time exposures)
Choice of test color set (different sets might be used for different classes of scene materials, e.g. outdoors, portraits, etc.)
primary spectra of all film sensitivity layers and dyes used
differences between film batches
aging of film from manufacture to development variations in developer, its aging, its temperature variations in development time.

Figure 2:
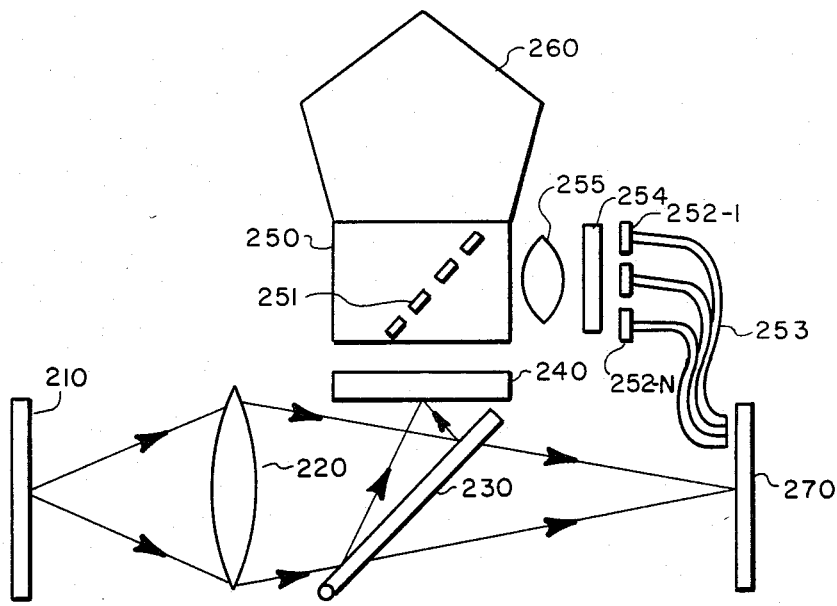
FIG. 2 is a diagram of photographic apparatus in accordance with the present invention wherein a secondary lens and shutter gather light samples to a location on the margin of the color film incorporated in the system.

In those cases where it is impractical to sample the illumination source by any of the methods described, a "backup" color test set can be made by using a similar system illuminated by a known (reference) source of broad spectrum white light in a similar configuration, with the light source at the focus of lens 255 of FIG. 2. This configuration can be entirely internal to the camera and require no operator attention whatever. Alternatively, a set of LED's of suitable colors to comprise a test set each illuminating one test spot could provide similar guidance to color correction. When the resulting set of test color spots are all that are available (i.e. in the absence of suitable sampled scene illumination), the resulting correction process retains its responsiveness to all but the first three of the above-listed parameters affecting color rendition.

Where photodetectors are used rather than spots on the same film, the last four items lose consideration in the correction process, provided correct spectra are used for the detectors, representing the film in use.

Figure 3:
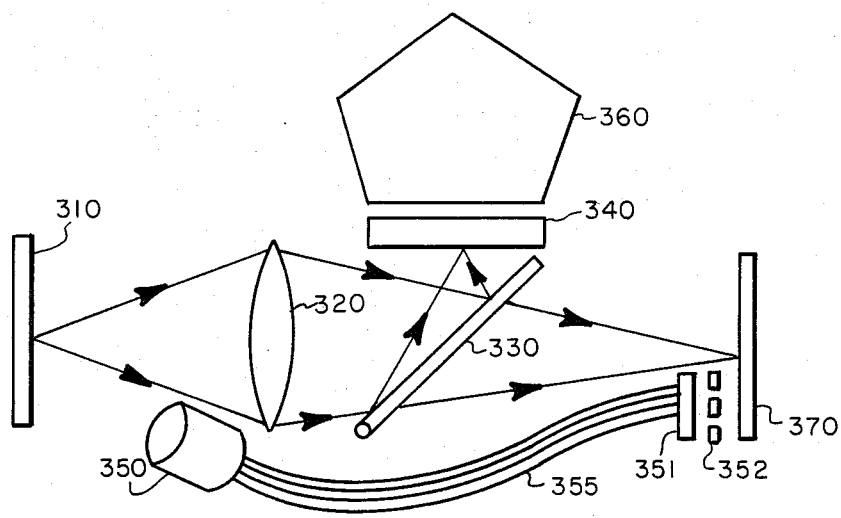
FIG. 3 is a diagram of photographic apparatus in accordance with the present invention wherein a separate optic probe is used in gathering light information, conducting same through fiber optic bundles to a secondary shutter and, in response to that shutter's operation, on through a plurality of filters for recording on the margin of the color film included in the apparatus.
Figure 4:
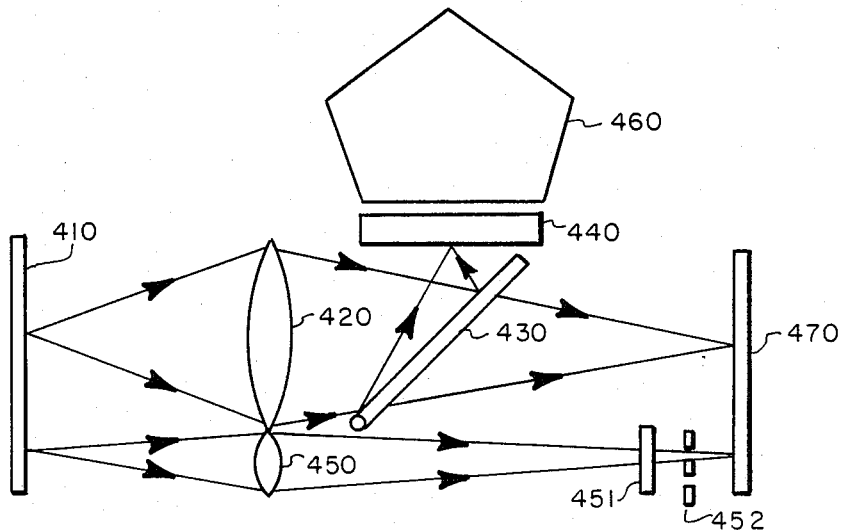
FIG. 4 is a diagram of photographic apparatus in accordance with the present invention wherein there is included a secondary lens and secondary shutter which operate cooperatively to conduct a sample of light through a plurality of filters to a location on the margin of the included color film.

An alternative way to sample the prime illumination source, either before or after taking the picture is to direct the camera toward a white object in the scene or the light source using a calibration exposure control separate from the shutter that will conduct the test light to a chosen area in the film margin as shown in FIG. 3. In FIG. 4, an auxiliary lens would conduct the light through the test filter array to the film margin. The shutter for this operation would be supplied which would operate independently of the main film shutter.

Figure 5:
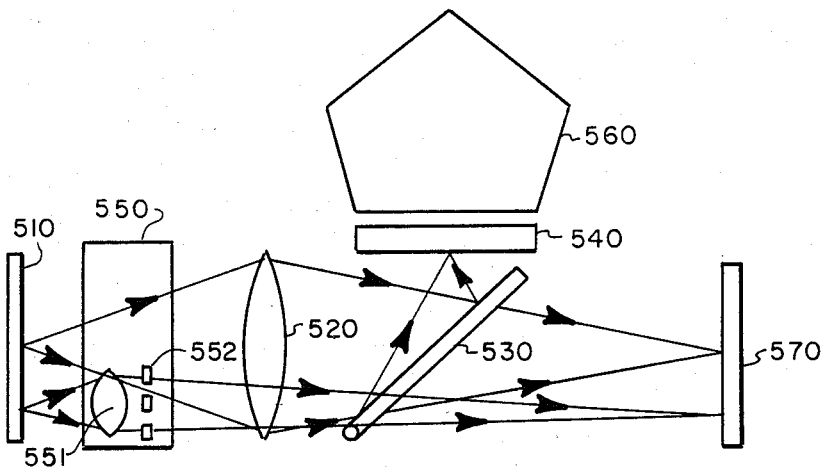
FIG. 5 is a diagram of photographic apparatus in accordance with the present invention wherein an accessory item is provided for placement over the principal lens of the photographic system, the accessory including a secondary lens and a plurality of filters operable to conduct a sample of light and the colored samples derived therefrom through the principle lens of the photographic apparatus to the color film included therein providing an indication of the color included in the scene on which the photographic apparatus is focused.

To avoid modification of the existing cameras, an add-on accessory could be made for use in the main film area for use in "before" or "after" taking an important picture. This device would utilize a full frame of the film with an image of a test filter array with the camera pointed again at a primary light source as shown in FIG. 5.

The utilization of the test spots requires first a choice of a set of test spot colors that serves as a fair representation of the class of scene material involved, e.g. outdoor scenes, portraits, etc. Secondly it requires a tabulation of the colorimetric coordinates, X,Y,Z of each of these test colors both as measured in the original test spots or reflective patches and as reproduced by the negative or film. Where it is not practical to record these color spots on the same film as used for the photographed scene, there is a loss of corrective ability against certain film and processing characteristics. However, the ability to correct for illumination color, given the correct film spectra is retained. Thus, the electronic detector embodiments while useful as well as practical where the correction system cannot be built into the camera, does not calibrate the film and processing conditions as well as the preferred embodiment. From the tabulation of original and reproduced color coordinates of the test color set, the corrective algorithm and associated matrixing procedure (which can be carried out in making prints by a scanner system, or by a color separation procedure) can be implemented to correct for all the factors that could distort color rendition that have entered into the reproduction of the test color set from the originals. Very broadly, this represents "equalization" of a standard test response.

The above techniques and apparatus can also be utilized for film calibration.

The apparatus and techniques of the present invention may be utilized for illumination calibration to correct copies of or prints made from an original slide or negative as noted. This arrangement is for use in copy correction after the initial photographic exposure. In a proposed arrangement as shown in FIG. 3 a test array is exposed on the film margin outside of the picture format rather than being recorded in a set of electronic detectors. To avoid interference with the picture taken, it may be found desirable to conduct a sample of source light via an appropriately directed fiber optic probe 350 with fiber conductors 355 extending to the margin of film 370. This marginal area is outside the normal image format preferrably being located between sprocket holes traditionally found on 35 millimeter film. The light however is passed from the fiber optics 355 through test filter array 352 causing the appropriate test color information to be recorded on the film margin. This is done simultaneously with the main exposure of the film 370, by operation of the main shutter (not shown) and calibration shutter 351 at the same time.

In the arrangement shown in FIG. 2 the viewfinder includes focusing optics of a conventional exposure meter including the base 250 for pentaprism 260, beam splitter 251 divides the view between the viewfinder focus system and the calibration system of the instant invention. The calibration focusing system 255 operates on only a selectable area of the focused image, thus allowing the photographer to choose the image area of optimal focus. In the same way, a similar selection is provided for the exposure meter. As shown in FIG. 2 the set of fiber optic bundles 253 conduct sample light from each of the test filters 252-1 through 252-N to the assigned location in the margin of film 270. The hinged mirror 230 is shown in the viewfinder position which permits gathering of color calibration information. In its alternate position, light focused through lens 220 would be focused directly upon film 270 and the scene 210 would be projected on the film.

As indicated other methods of producing the color calibration information on film margins are shown in FIGS. 3, 4 and 5. In FIG. 3, calibration information is recorded simultaneously with the picture. In this particular arrangement a fiber optic probe 350 would be directed at the prime light source and illuminating scene 310. The light would then be directed via fiber optic bundle 355 to calibration shutter 351 which would be linked to the main shutter of the camera. On operation of shutter 351 the light would be passed through a test filter array 352 for recording on the margin of film 370 in that portion outside the normal picture format.

Another arrangement shows the utilization of an auxiliary lens 450 and an auxiliary shutter 451 which operates independent of the main camera shutter. In this arrangement the auxiliary lens would be directed at a source of illumination or white object appearing in the scene 410 for calibration purposes. Light being directed through lens 450 and in response to operation of calibration shutter 451, is passed through filter array 452 to the margin of film 470. After the calibration operation is complete the picture may be taken in the usual manner. Alternately, the picture could be taken first and the calibration information taken subsequently.

A final embodiment consists of use of an auxiliary or add-on accessory that can be utilized with an unmodified camera. As shown in FIG. 5, this device 550 includes an auxiliary lens 551 and test array 552. In this instance, with the calibration device in place the main lens becomes focused on the test array and the auxiliary lens is then aimed at a source of illumination or white object that is a part of picture 510 or alternately a white object that might be included with test array within the aperture of the add-on device 550. Thus, the calibration information would be exposed on the frame of film 570 after which the accessory would be removed and the picture taken in the conventional manner.

Use of the present techniques for film calibration is useful for correcting copies for process variations or fading of an original negative and/or a copying process. This technique is done outside of the camera rather than as part of the original photo process. In the proposed arrangement, source color is not calibrated. Instead a test array is provided with standard reference illumination which may be placed in the film margin in the manner described above. However, this takes place just before development as part of processing, as an alternative to placement of this operation in the camera. As proposed, this arrangement will allow compensation for variations in processing as well as for fading with age. In fact where allowance is made, for the sample picture information as it corresponds to the standard matrix, it is derived from the calibration test array. The color recognition algorithm as set forth in our pending application may be applied with closer tolerances to the corrected picture information. This results in improved probability of recognizing an actual scene illumination condition and actual scene colors.

If necessary, a partial calibration correction can be carried out and the parameters stored in association with each film type with some of the above advantages, except for lack of correction for variations of film parameters within a given film type due to natural tolerances as well as for processing variations. This type of correction can be applied when the test spots actuate electronic detectors rather than the film itself.

Automatic correction when light source illumination temperatures are unknown is possible with the help of film calibration as discussed above. Comparison can be made with a library of standard test colors under a range of illumination temperatures which may be applied in the same manner as applied to video technology as discussed in our copending application. The recognition algorithm that will be utilized in such case is substantially the same for both film and video implementations.

Further usage of the apparatus and techniques of the present invention may be employed for custom correction, where individual attention by an operator is available. In this arrangement, specific color areas of a photograph may be manually selected to correspond to specific target colors from a "color library." In this case, the recognition algorithm of the copending application may be bypassed by the operator since there is no need to identify illumination temperatures as the uncorrected colors and the corresponding target colors may be both directly input to the system as previously described. Because of the need for operator attention and selection of the target values this is a semi-automatic arrangement compared to the above. However, for artistic reproduction or other correction requirements, the degree of automation may compare favorably with any of the available alternatives in achieving color rendition quality that include asthetic judgments as well as in processing efficiency and productivity.

As regards intensities in this arrangement, two options are available. In the first, when a particular color has been selected the target color specification includes a particular intensity. Straight forward application of the correction algorithm will take into consideration the intensity as well as hue in corrections required during printing.

As an alternative when color identifications are made by either the color recognizer or human operator as described above, the target intensity may be unspecified and only the hue or chromaticity is known. An appropriate correction algorithm, in this case, let it be proportional to the relative intensity value actually present in the photograph. Once a target intensity and hue have been established the correction algorithm can be applied as in the fully automated recognition and correction system. The correction algorithm is the same as in the copending application. Such details as the sensitivity and display spectra and the means by which matrixing is accomplished are all that differ from the video application. The closer to linearity in the medium being corrected, the greater the range of intensities of the same color to which the resulting correction applies and the more satisfying such custom correction option is likely to be, as long as the correction algorithm of our copending application utilizes a linear model of the reproduction process within the correction computer. At the expense of further complexity in this model, as used in the correction computer, it would be possible to allow for any known nonlinear characteristics as are commonplace in photographic materials over as broad a dynamic range as the additional calculation complexity justifies.

While several embodiments of the present invention have been shown, it will be obvious to those skilled in the art that numerous other modifications and variations may be suggested without departing from the spirit and scope of the present invention which shall be limited only by the scope of the claims appended hereto.

We claim:

1. A method of compensating for color variations in the light source illuminating a scene to be photographed, said method comprising
   A. collecting a sample of light from said illuminating source;
   B. coupling said sample to a plurality of test filters of preselected colors;
   C. recording a color sample from each said test filter;
   D. comparing each said recorded color sample against a corresponding plurality of color reference standards; and
   E. calculating from said comparison the color compensation required to correct for said color variations in said light source.

2. The method defined in claim 1 further including the step of filtering said light source with a filter whose color value has been determined in step E.

3. The method defined in claim 2 further including the step of photographing said scene through said filter whose color value was determined by step E.

4. The method defined in claim 1 further including the step of photographing said scene concurrently with step C.

5. The method defined in claim 1 further including the step of photographing said scene after step C and before step D.

6. The method defined in claim 1 further including the step of photographing said scene prior to step A.

7. A camera including color sensitive film, a viewfinder, a first shutter and a first lens adapted in response to the operation of said shutter photographically to record on said film a scene visible in said viewfinder on which said lens is focused, the improvements comprising: means for collecting a sample of the light illuminating said scene; a plurality of color test filters of preselected colors; light conducting means between said collecting means and each of said test filters for conducting said light sample to each said filter; and color detection means adjacent each said test filter operative to provide a plurality of indications of the respective colors included in said light illuminating said scene.

8. A camera according to claim 7 wherein: there is further included in said viewfinder a view plane, a pentaprism and a beam splitter therebetween; said color test filters being disposed adjacent to said beam splitter; said beam splitter operative to conduct a visual representation of said scene to said pentaprism and to conduct said sample of the light illuminating said scene to said test filters.

9. A camera is claimed in claim 7 wherein said color detection means comprises a plurality of photodectors sensitive to the preselected colors of said color test filters.

10. A camera as claimed in claim 9 wherein the output of each of said plurality of photodetector is a digital representation of each of said preselected colors in the light illuminating said scene.

11. A camera as claimed in claim 8 wherein: there is further included a second lens and shutter means operative to conduct said light sample from said beam splitter to said color test filters; and a light guide coupled between said filter and a portion of said color film to conduct light received through each of said filters to said portion of said film.

12. A camera as claimed in claim 11 wherein: there is further included a second shutter operative to permit said light sample from said scene to be conducted to said film.

13. A camera as claimed in claim 7 wherein: said light sample collecting means comprises a fiber optic probe.

14. A camera as claimed in claim 13 wherein: there is further included a second shutter adjacent said color test filters; and said light conducting means comprise a plurality of glass optical fibers connected between said probe and terminating adjacent said second shutter; said second shutter operative to permit said light sample collected by said probe and conducted over said optical fibers to be transmitted through said color test filters; and a light guide coupled between said filters and a portion of said color film to conduct light received through each of said filters to said portion of said film.

15. A camera as claimed in claim 7 wherein: there is further included a second lens and a second shutter operative to conduct light illuminating said scene and focused through said second lens to be transmitted through said color test filters and recorded on said film.

16. A camera as claimed in claim 7 wherein said improvements constitute an accessory apparatus to be interposed between said scene and said first lens whereby light received through each of said filters is recorded on said film.

* * * * *